US008545032B2

(12) United States Patent
Chen et al.

(10) Patent No.: US 8,545,032 B2
(45) Date of Patent: Oct. 1, 2013

(54) LIGHT SOURCE MODULE AND WAVELENGTH CONVERSION MODULE

(75) Inventors: Ko-Shun Chen, Hsin-Chu (TW); Tzu-Yi Yang, Hsin-Chu (TW); Po-Shan Song, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 218 days.

(21) Appl. No.: 13/048,902

(22) Filed: Mar. 16, 2011

(65) Prior Publication Data

US 2011/0242791 A1 Oct. 6, 2011

(30) Foreign Application Priority Data

Apr. 1, 2010 (CN) .......................... 2010 1 0156949

(51) Int. Cl.
*F21V 9/16* (2006.01)
(52) U.S. Cl.
USPC ............................................ 362/84; 362/260
(58) Field of Classification Search
USPC ............. 362/84, 260, 296.01, 311.11, 217.05
See application file for complete search history.

(56) References Cited

U.S. PATENT DOCUMENTS

| | | | |
|---|---|---|---|
| 6,762,785 B2 | 7/2004 | Roddy et al. | |
| 6,765,727 B1* | 7/2004 | Chang | 359/630 |
| 7,070,300 B2 | 7/2006 | Harbers et al. | |
| 7,445,340 B2 | 11/2008 | Conner et al. | |
| 7,547,114 B2 | 6/2009 | Li et al. | |
| 2004/0233664 A1* | 11/2004 | Beeson et al. | 362/231 |
| 2005/0270775 A1* | 12/2005 | Harbers et al. | 362/231 |
| 2005/0280785 A1* | 12/2005 | Beeson et al. | 353/97 |
| 2006/0077673 A1* | 4/2006 | Berman et al. | 362/458 |
| 2007/0024191 A1* | 2/2007 | Chen et al. | 313/512 |
| 2009/0153582 A1 | 6/2009 | Hajjar et al. | |
| 2009/0262308 A1 | 10/2009 | Ogawa | |
| 2010/0290208 A1* | 11/2010 | Pickard | 362/84 |

FOREIGN PATENT DOCUMENTS

| | | |
|---|---|---|
| CN | 1885645 | 12/2006 |
| CN | 101498401 | 8/2009 |
| JP | 2003098257 | 4/2003 |
| JP | 2009-150938 | 7/2009 |
| TW | 00541834 | 7/2003 |

OTHER PUBLICATIONS

"First Office Action of China Counterpart Application", issued on Apr. 20, 2012, p1-p7, with English translation thereof, in which the listed references were cited.

* cited by examiner

*Primary Examiner* — Anh Mai
*Assistant Examiner* — Andrew Coughlin
(74) *Attorney, Agent, or Firm* — Jianq Chyun IP Office

(57) ABSTRACT

A light source module and a wavelength conversion module are provided. The light source module includes a first light emitting device, a reflection unit, a wavelength conversion unit, a second light emitting device and a light combination unit. The first light emitting device emits an exciting beam. The reflection unit is disposed on a transmission path of the exciting beam. The wavelength conversion unit is disposed on the reflection unit and located on the transmission path of the exciting beam. The exciting beam is obliquely incident into the wavelength conversion unit along an optical axis of the first light emitting device, and the wavelength conversion unit converts the exciting beam into a first color beam. The second light emitting device emits a second color beam. The light combination unit is disposed on transmission paths of the first color beam and the second color beam.

13 Claims, 4 Drawing Sheets

LIGHT SOURCE MODULE AND WAVELENGTH CONVERSION MODULE

CROSS-REFERENCE TO RELATED APPLICATION

This application claims the priority benefit of China application serial no. 201010156949.2, filed Apr. 1, 2010. The entirety of the above-mentioned patent application is hereby incorporated by reference herein and made a part of this specification.

BACKGROUND

1. Field of the Invention

The invention relates to an optical module. More particularly, the invention relates to a light source module and a wavelength conversion module.

2. Description of Related Art

With development of display technology, a projection apparatus may use an ultra high pressure lamp (UHP lamp) for emitting white light together with a color wheel to sequentially generate red light, green light, and blue light, so that the projection apparatus can provide color images. In recent years, a projection apparatus using red, green, and blue light emitting diodes (LEDs) as light sources is further developed.

In the projection apparatus using the LEDs as the light sources, beams emitted from the red, green, and blue LEDs are combined through a light combination system, so that different color beams from different propagating directions can be guided to a same direction. Since a brightness of such projection apparatus is determined by brightness of the LEDs in such kind of projection apparatus, and the green LED is the light source of main brightness contribution, the whole brightness of the projection apparatus depends on a light emitting efficiency of the green LED. However, the light emitting efficiency of the existing green LED is low, and is not suitable to serve as the light source of a high brightness projector.

U.S. Pat. No. 6,762,785 discloses a light source module including a red light source, a green light source, a blue-green light source, and a blue light source. FIG. 1 of U.S. Pat. No. 7,445,340 discloses an LED for generating a blue beam or an ultraviolet beam, and the light beam is reflected by an optical polarization beam splitter and propagated to a reflector, and then the light beam is absorbed by phosphor powder to excite a green beam. FIG. 3a and FIG. 4 of U.S. Pat. No. 7,547,114 disclose a wheel having light conversion materials such as phosphors, and the beam emitted from the LED irradiates the wheel, so that light beams of a plurality of colors can be generated through the excitation of the light conversion materials. FIG. 1 of U.S. Pat. No. 7,070,300 discloses an LED light source, an enhanced light emitting structure, and phosphor powder. According to FIG. 4 of U.S. Patent Publication No. 20090262308, a blue exciting beam generated by a light source is propagated to the phosphor powder coated on a light transparent device, so as to generate a green beam. This green beam is combined with another green beam from a green light source to generate a combined green beam. A dichroic mirror is used to combine a red beam, the combined green beam, and a blue beam into an illumination beam. FIG. 4 and FIG. 5 of Japan Patent No. 2009-150938 disclose that an exciting beam generated by a blue exciting light source is reflected within an optical cavity, and is guided to a phosphor material to generate the green beam.

SUMMARY

The invention is directed to a light source module having a relatively high brightness.

The invention provides a wavelength conversion module having better light conversion efficiency.

Additional aspects and advantages of the invention will be set forth in the description of the techniques disclosed in the invention.

To achieve one of or all aforementioned and other advantages, an embodiment of the invention provides a light source module including a first light emitting device, a reflection unit, a wavelength conversion unit, a second light emitting device, and a light combination unit. The first light emitting device is used for emitting an exciting beam. The reflection unit is disposed on a transmission path of the exciting beam. The wavelength conversion unit is disposed on the reflection unit, and is located on the transmission path of the exciting beam. The exciting beam is obliquely incident into the wavelength conversion unit along an optical axis of the first light emitting device, and the wavelength conversion unit converts the exciting beam into a first color beam. The second light emitting device is used for emitting a second color beam. The light combination unit is disposed on transmission paths of the first color beam and the second color beam, and is used for combining the first color beam and the second color beam.

Another embodiment of the invention provides a wavelength conversion module including a reflection unit, a wavelength conversion unit, and a dichroic unit. The wavelength conversion unit is disposed on the reflection unit. The dichroic unit is connected to the reflection unit, and is disposed obliquely with respect to the reflection unit. The reflection unit and the dichroic unit form a space therebetween, wherein the reflection unit and the dichroic unit form a closed end at one end of the space, and form an open end at another end of the space.

According to the above descriptions, the embodiments of the invention may have at least one of the following advantages or effects. In the light source module according to the embodiment of the invention, since the exciting beam is obliquely incident on the wavelength conversion unit along the optical axis of the first light emitting device, a transmission path of the exciting beam in the wavelength conversion unit is lengthened, so that more exciting beam can be converted into the first color beam. In this way, an intensity of the first color beam is enhanced, so that the light source module may have a higher brightness, and light conversion efficiency for converting the exciting beam into the first color beam can be improved. Moreover, in the wavelength conversion module according to the embodiment of the invention, since the dichroic unit is disposed obliquely with respect to the reflection unit, the beam converted by the wavelength conversion unit is convergently propagated to the open end of the space formed by the wavelength conversion unit and the dichroic unit, so as to effectively improve the light conversion efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
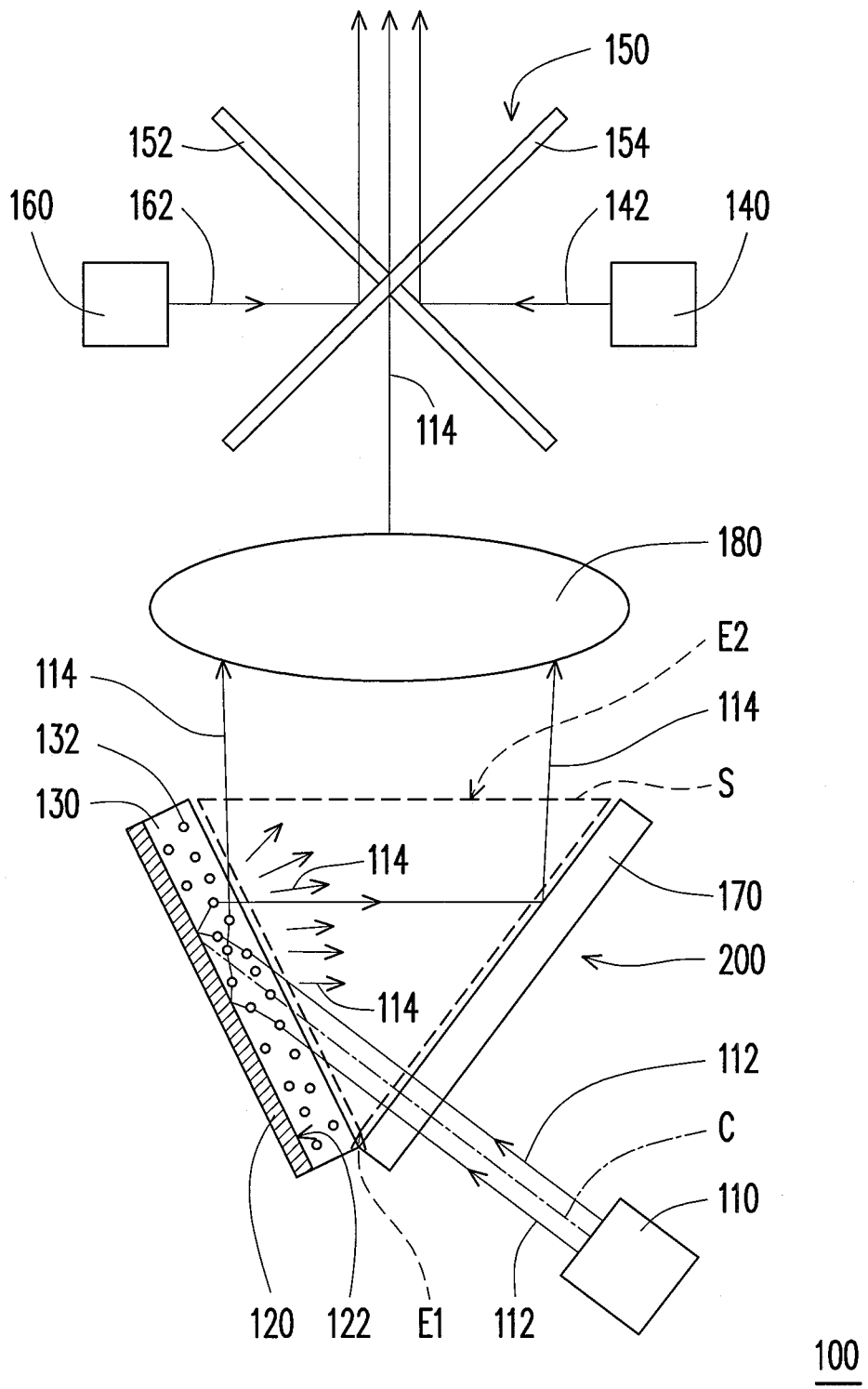
FIG. 1 is a schematic diagram illustrating a light source module according to an embodiment of the invention.

FIG. 1 is a schematic diagram illustrating a light source module according to an embodiment of the invention. Referring to FIG. 1, the light source module 100 of the present embodiment includes a first light emitting device 110, a reflection unit 120, a wavelength conversion unit 130, a second light emitting device 140, and a light combination unit 150. The first light emitting device 110 is used for emitting an exciting beam 112. In the present embodiment, the first light emitting device 110 is, for example, a laser light source, and the exciting beam 112 is, for example, a laser beam. However, in other embodiments, the first light emitting device 110 can also be a light emitting diode (LED). The reflection unit 120 is disposed on a transmission path of the exciting beam 112. In the present embodiment, the reflection unit 120 has a reflective surface 122, and the reflection unit 120 is, for example, a reflection plate.

The wavelength conversion unit 130 is disposed on the reflection unit 120, for example, on the reflective surface 122, and is located on the transmission path of the exciting beam 112. In the present embodiment, the exciting beam 112 is, for example, a blue beam, and the wavelength conversion unit 130 is, for example, a phosphor layer. In the present embodiment, a material of the wavelength conversion unit 130 includes a green phosphor material 132. The wavelength conversion unit 130 is used for converting the exciting beam 112 into a first color beam 114. In detail, in the present embodiment, when the exciting beam 112 having a relatively short wavelength is propagated to the wavelength conversion unit 130, it is converted into the first color beam (i.e. fluorescence or phosphorescence) with a relatively long wavelength by the green phosphor material 132, i.e. the first color beam 114 is a green beam. For example, the wavelength of the exciting beam 112 is, for example, within a range of 350-450 nanometers, and the wavelength of the first color beam 114 is, for example, within a range of 520-560 nanometers. Moreover, in the present embodiment, the exciting beam 112 is obliquely incident into the wavelength conversion unit 130 along an optical axis C of the first light emitting device 110 (i.e. an incident angle that the exciting beam 112 enters the wavelength conversion unit 130 is greater than 0 degree and smaller than 90 degrees). The exciting beam 112 entering the wavelength conversion unit 130 is propagated within the wavelength conversion unit 130. A part of the exciting beam 112 is converted into the first color beam 114 by the green phosphor material 132, and another part of the exciting beam 112 is continually propagated to the reflection unit 120 and is reflected by the reflection unit 120, and is continually propagated within the wavelength conversion unit 130 after reflection.

In the present embodiment, since the exciting beam 112 is obliquely incident into the wavelength conversion unit 130 along the optical axis C of the first light emitting device 110, the transmission path that the exciting beam 112 is propagated within the wavelength conversion unit 130 can be lengthened, so as to increase a opportunity for converting the exciting beam 112 into the first color beam 114 by the wavelength conversion unit 130. In this way, light conversion efficiency for converting the exciting beam 112 into the first color beam 114 is enhanced, so that an intensity of the first color beam 114 is increased, and accordingly the light source module 100 may have a higher brightness.

The second light emitting device 140 is used for emitting a second color beam 142. In the present embodiment, the second light emitting device 140 is a light emitting diode (LED), which is, for example, a blue LED. The light combination unit 150 is disposed on transmission paths of the first color beam 114 and the second color beam 142, and is used for combining the first color beam 114 and the second color beam 142.

In the present embodiment, the light source module 100 further includes a third light emitting device 160 for emitting a third color beam 162, wherein the light combination unit 150 is further disposed on a transmission path of the third color beam 162, so as to combine the first color beam 114, the second color beam 142, and the third color beam 162.

In the present embodiment, the light combination unit 150 includes a first dichroic device 152 and a second dichroic device 154. The first dichroic device 152 is used for transmitting one of the first color beam 114 and the second color beam 142, and is used for reflecting the other one of the first color beam 114 and the second color beam 142. The second dichroic device 154 is used for transmitting one of the first color beam 114 and the third color beam 162, and is used for reflecting the other one of the first color beam 114 and the third color beam 162. In the present embodiment, the first color beam 114, the second color beam 142, and the third color beam 162 are respectively a green beam, a blue beam, and a red beam. Moreover, the first dichroic device 152 and the second dichroic device 154 are each a dichroic mirror, for example. However, in other embodiments, the first dichroic device 152 and the second dichroic device 154 can also be each a dichroic coating layer coated on a prism. In the present embodiment, the first dichroic device 152 is used for transmitting the first color beam 114 and is used for reflecting the second color beam 142. However, in another embodiment, the first dichroic device 152 is used for transmitting the second color beam 142 and is used for reflecting the first color beam 114. In such embodiment, comparing with the embodiment in FIG. 1, the position of the second light emitting device 140 and a whole position of the first light emitting device 110, the reflection unit 120 and the wavelength conversion unit 130 are exchanged. In the present embodiment, the second dichroic device 154 is used for transmitting the first color beam 114 and is used for reflecting the third color beam 162. However, in another embodiment, the second dichroic device 154 is used for transmitting to the third color beam 162 and is used for reflecting the first color beam 114. In such embodiment, comparing with the embodiment in FIG. 1, a position of the third light emitting device 160 and a whole position of the first light emitting device 110, the reflection unit 120 and the wavelength conversion unit 130 are exchanged. Moreover, in the present embodiment, the first dichroic device 152 and the second dichroic device 154 are intersected. In this way, the light combination unit 150 can combine the first color beam 114, the second color beam 142, and the third color beam 162. In the present embodiment, when the first light emitting device 110, the second light emitting device 140 and the third light emitting device 160 are operated, the first color beam 114, the second color beam 142, and the third color beam 162 can be combined into a white beam. Moreover, when the first light emitting device 110, the second light emitting device 140, and the third light emitting device 160 are alternately and quickly turned on/off, and after the first color beam 114, the second color beam 142, and the third color beam 162 are alternately incident to the light combination unit 150, a color image can be generated based on a visual persistence effect of human eyes. Therefore, when the invention mentions that "the light combination unit for combining the first color beam and second color beam" or the like, it means that the first color beam and second color beam may be or not be incident to the light combine unit simultaneously or at the same time. In other words, even the first color beam is incident to the light combination unit first and then following the second color beam is incident to the light combination unit, so that the first color beam and the second color beam propagate along the same transmission path after the first color beam and second color beam are passed through the light combination unit (e.g. transmission through the light combination unit or refection by the light combination unit), it is still within the scope of "the light combination unit combining the first color beam and the second color beam" or the like.

Since human eyes are sensitive to the green color, the green beam is a main reference for determining the brightness. However, a light emitting intensity of an existing green LED is limited, so that a brightness of an existing light source module using the LEDs is limited. The light source module 100 of the present embodiment can effectively resolve such problem since the light source module 100 uses the first light emitting device 110 having a light emitting intensity greater than that of the green LED (in the present embodiment, a laser light source is taken as an example, and in other embodiments, the LED having a wavelength shorter than the green beam can also be used, such as a blue LED or an ultraviolet (UV) LED) to emit the exciting beam 112 to excite the wavelength conversion unit 130, so that the wavelength conversion unit 130 can emit the green beam (the first color beam 114) with light intensity greater than a light emitting limitation of the green LED. Therefore, the light source module 100 of the present embodiment can break through the limitation of the existing LED light source module.

In the present embodiment, the light source module 100 further includes a dichroic unit 170 disposed on the transmission path of the exciting beam 112 and located between the first light emitting device 110 and the wavelength conversion unit 130. The dichroic unit 170 is used for transmitting the exciting beam 112, so that the exciting beam 112 can be propagated to the wavelength conversion unit 130. The dichroic unit 170 can also be used for reflecting the first color beam 114 emitted from the wavelength conversion unit 130 to the light combination unit 150. In the present embodiment, the dichroic unit 170 is, for example, a dichroic mirror. Moreover, in the present embodiment, the dichroic unit 170 is disposed obliquely with respect to the reflection unit 120. In this way, a part of the first color beam 114 from the wavelength conversion unit 130 that emits towards the light combination unit 150 can be propagated to the light combination unit 150, and another part of the first color beam 114 emits towards a direction departed from the light combination unit 150 can be reflected by the dichroic unit 170 and be propagated to the light combination unit 150 without wasting. Moreover, the first color beam 114 can also be repeatedly reflected between the reflection unit 120 and the dichroic unit 170, and is then propagated to the light combination unit 150. In the present embodiment, the reflection unit 120, the wavelength conversion unit 130, and the dichroic unit 170 as a whole can be regarded as a wavelength conversion module 200. By using the wavelength conversion module 200, the light conversion efficiency of the light source module 100 of the present embodiment can be further improved, so as to increase a whole brightness of the light source module 100.

In the present embodiment, the light source module 100 further includes a convergent lens 180 disposed on the transmission path of the first color beam 114 and located between the wavelength conversion unit 130 and the light combination unit 150. In this way, the first color beam 114 can be concentrated to the light combination unit 150, so that light utilization efficiency of the first color beam 114 is improved.

Figure 2:
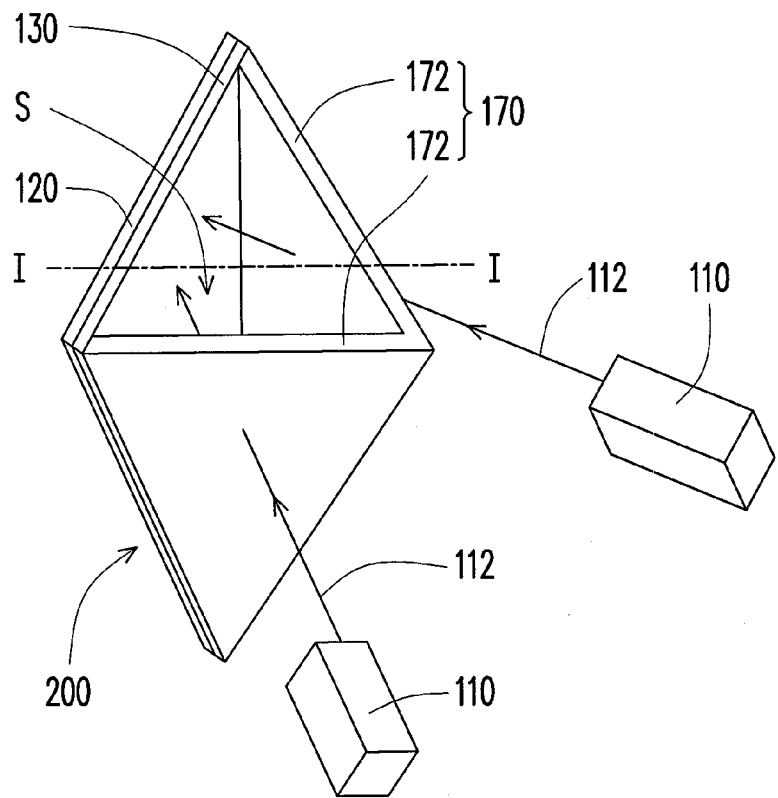
FIG. 2 is a three-dimensional view of a reflection unit, a wavelength conversion unit, a dichroic unit and a first light emitting device in a light source module of FIG. 1.

FIG. 2 is a three-dimensional view of the reflection unit, the wavelength conversion unit, the dichroic unit, and the first light emitting device in the light source module of FIG. 1. The reflection unit 120, the wavelength conversion unit 130, the dichroic unit 170, and the first light emitting device 110 illustrated in FIG. 1 are cross-sectional views of these units in FIG. 2 along a cut line I-I. Referring to FIG. 1 and FIG. 2, in the present embodiment, the wavelength conversion unit 130 and the dichroic unit 170 form a space S therebetween. The wavelength conversion unit 130 and the dichroic unit 170 form a closed end at a first end E1 of the space S, and the wavelength conversion unit 130 and the dichroic unit 170 form an open end at a second end E2 of the space S. In the present embodiment, the closed end is formed by connecting the dichroic unit 170 and the wavelength conversion unit 130, so that the first color beam 114 can concentratively emit out from the second end E2 of the space S, so as to reduce a light loss caused by light leakage.

Referring to FIG. 2, in one embodiment, the dichroic unit 170 includes N bending parts 172, and each bending part 172 has a planar shape, and the reflection unit 120 may also have a planar shape. An angle greater than 0 degree and smaller than 180 degrees is formed between any two adjacent bending parts 172. In the present embodiment, the first light emitting device 110 has a number of N light emitting devices, and N exciting beams 112 emitted from the N light emitting devices 110 respectively pass through the N bending parts 172 and are propagated to the wavelength conversion unit 130. N is greater than or equal to 2 in the present embodiment. For example, in the embodiment of FIG. 2, N is equal to 2. By increasing the number N, the intensity of the first color beam 114 of the light source module 100 can be further increased, so as to increase the whole brightness of the light source module 100. However, in other embodiments, the first light emitting device 110 contains only one light emitting device, and the dichroic unit 170 and the reflection unit 120 both have planar shapes, and are disposed obliquely with respect to each other. In such embodiment, the dichroic unit 170 may be one plate and need not form an enclosed space with the wavelength conversion unit 130.

Figure 3:
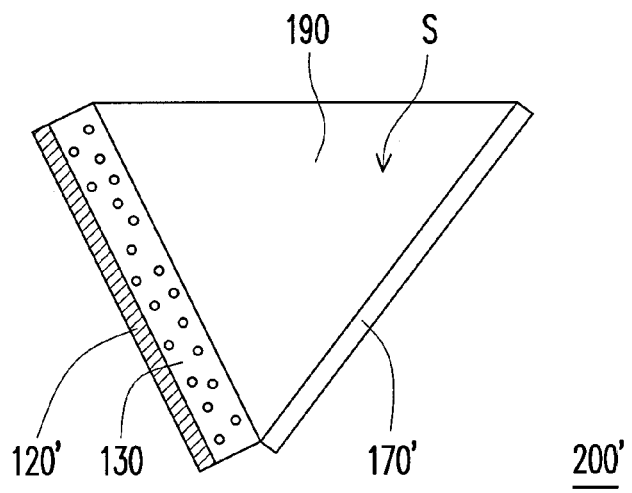
FIG. 3 is a cross-sectional view of a wavelength conversion module in a light source module according to another embodiment of the invention.

FIG. 3 is a cross-sectional view of a wavelength conversion module in a light source module according to another embodiment of the invention. The wavelength conversion module 200' of the present embodiment is similar to the wavelength conversion module 200 of FIG. 1. The main difference between the embodiments of FIG. 1 and FIG. 3 is that, in the present embodiment, the light source module further includes a light transparent body 190 (which can be regarded as that the wavelength conversion module 200' further includes the light transparent body 190) disposed in the space S. The wavelength conversion unit 130 and the dichroic unit 170' are disposed on the light transparent body 190. In the present embodiment, the dichroic unit 170' is, for example, a dichroic layer coated on a surface of the light transparent body 190, and the wavelength conversion unit 130 is coated on another surface of the light transparent body 190. Moreover, in the present embodiment, the reflection unit 120' is a reflective coating coated on the wavelength conversion unit 130.

Figure 4:
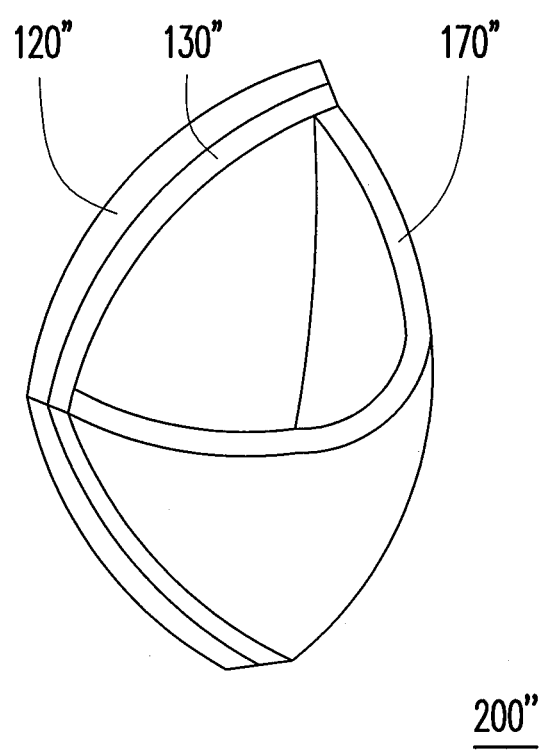
FIG. 4 is a three-dimensional view of a wavelength conversion module in a light source module according to still another embodiment of the invention.

FIG. 4 is a three-dimensional view of a wavelength conversion module in a light source module according to still another embodiment of the invention. The wavelength conversion module 200'' of the present embodiment is similar to the wavelength conversion module 200 of FIG. 2, and a difference therebetween is that a dichroic unit 170'' of the present embodiment has a curved shape, and a reflection unit 120'' and a wavelength conversion unit 130'' also have a curved shape, respectively. However, in other embodiments, the reflection unit and the wavelength conversion unit can also have a planar shape, and the dichroic unit has a curved shape. Alternatively, the dichroic unit may have a planar shape, and the reflection unit and wavelength conversion unit may have a curved shape.

Figure 5:
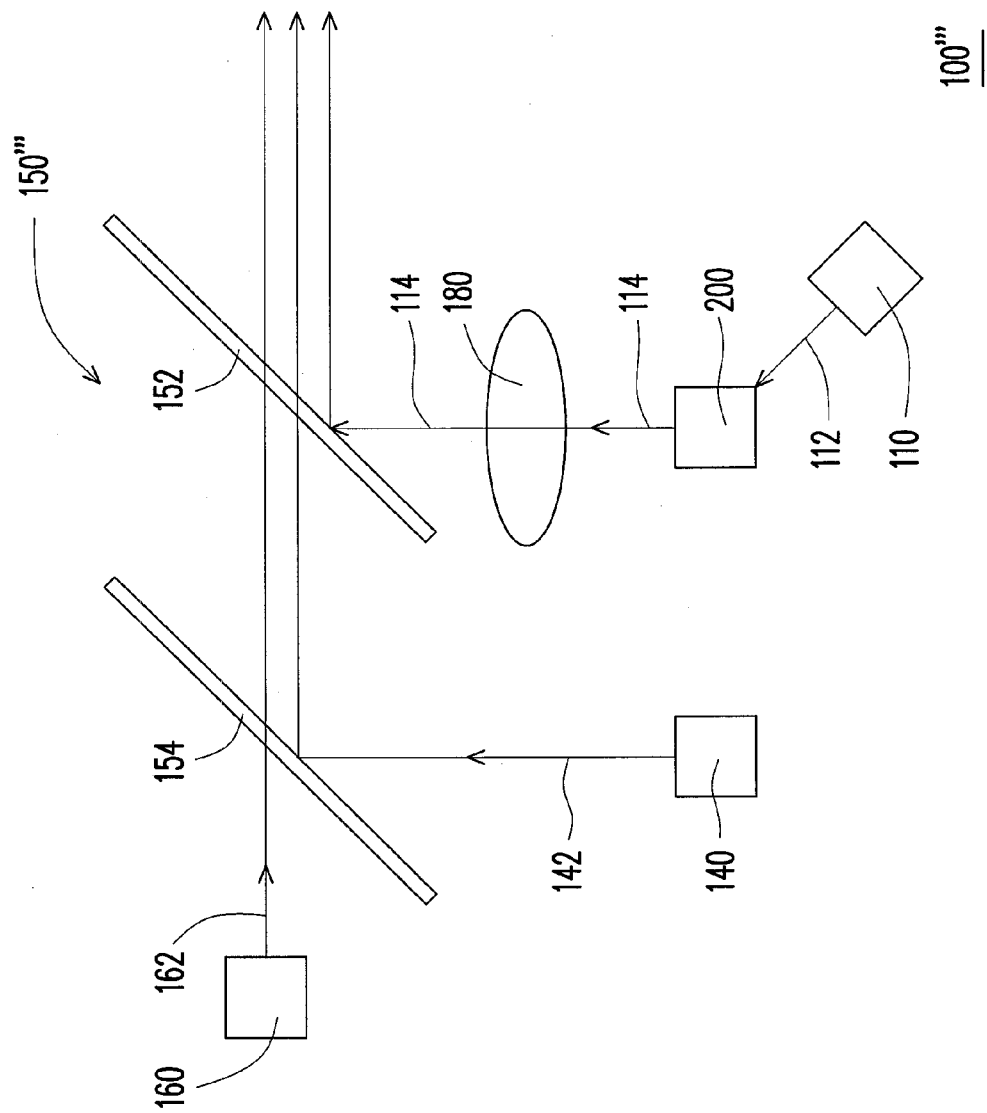
FIG. 5 is a schematic diagram illustrating a light source module according to yet another embodiment of the invention.

FIG. 5 is a schematic diagram illustrating a light source module according to yet another embodiment of the invention. The wavelength conversion module 200 in FIG. 5 is represented by a block, and a detailed structure of the wavelength conversion module 200 of FIG. 5 may be represented as either one of the embodiments explanatorily shown in FIGS. 2 to 4. Referring to FIG. 5, the light source module 100''' of the present embodiment is similar to the light source module 100 of FIG. 1. The main differences between the embodiment of FIG. 1 and FIG. 5 are as follows. In the light source module 100''' of the present embodiment, the first dichroic device 152 and the second dichroic device 154 of a light combination unit 150''' are not mutually intersected. In the present embodiment, the first dichroic device 152 and the second dichroic device 154 can be disposed in parallel. The first dichroic device 152 is used for transmitting one of the first color beam 114 and the second color beam 142, and is used for reflecting the other one of the first color beam 114 and the second color beam 142. The second dichroic device 154 is used for transmitting one of the second color beam 142 and the third color beam 162, and is used for reflecting the other one of the second color beam 142 and the third color beam 162.

In detail, in the present embodiment explanatorily shown in FIG. 5, the first dichroic device 152 is used for reflecting the first color beam 114, and is used for transmitting the second color beam 142 and the third color beam 162. However, in other embodiments, the first dichroic device 152 is used for reflecting the second color beam 142 and the third color beam 162, and is used for transmitting the first color beam 114. In the present embodiment, the second dichroic device 154 is used for reflecting the second color beam 142, and is used for transmitting the third color beam 162. However, in other embodiments, the second dichroic device 154 can be used for transmitting the second color beam 142, and is used for reflecting the third color beam 162.

Comparing with the embodiment explanatorily shown in FIG. 5, in other embodiments, positions of the first light emitting device 110 and the wavelength conversion module 200 as a whole, the second light emitting device 140, and the third light emitting device 160 can be exchanged. For example, the whole position of the first light emitting device 110 and the wavelength conversion module 200 is exchanged to the position of the second light emitting device 140, or the whole position of the first light emitting device 110 and the wavelength conversion module 200 is exchanged to the position of the third light emitting device 160, or positions of the second light emitting device 140 and the third light emitting device 160 are exchanged. When the positions of the above devices are exchanged, the transmission paths of the first color beam 114, the second color beam 142 and the third color beam 162 are accordingly exchanged, and as the transmission paths of the beams are exchanged, the first dichroic device 152 and the second dichroic device 154 are also changed to form the light combination unit 150''' of these transmission paths.

In summary, the embodiments of the invention may have at least one of the following advantages or effects. In the light source module according to the embodiments of the invention, since the exciting beam is obliquely incident into the wavelength conversion unit along the optical axis of the first light emitting device, a transmission path of the exciting beam in the wavelength conversion unit is lengthened, so that more exciting beam can be converted into the first color beam. In this way, an intensity of the first color beam is enhanced. Therefore, the light source module may have a higher brightness, and light conversion efficiency for converting the exciting beam into the first color beam can be improved. Moreover, in the wavelength conversion module according to the embodiments of the invention, since the dichroic unit is disposed obliquely with respect to the reflection unit and wavelength conversion unit, the beam converted by the wavelength conversion unit is concentratively propagated to the open end of the space formed by the wavelength conversion unit and the dichroic unit, so as to effectively improve the light conversion efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
a first light emitting device, for emitting an exciting beam, wherein the exciting beam is a laser beam;
a reflection unit, disposed on a transmission path of the exciting beam;
a wavelength conversion unit, disposed on the reflection unit, and located on the transmission path of the exciting beam, wherein the exciting beam is obliquely incident into the wavelength conversion unit along an optical axis of the first light emitting device, and the wavelength conversion unit converts the exciting beam into a first color beam;
a second light emitting device, for emitting a second color beam; and
a light combination unit, disposed on transmission paths of the first color beam and the second color beam, for combining the first color beam and the second color beam;
a dichroic unit, disposed on the transmission path of the exciting beam and located between the first light emitting device and the wavelength conversion unit, wherein the dichroic unit is for transmitting the exciting beam to the wavelength conversion unit, and is for reflecting the first color beam emitted from the wavelength conversion unit to the combination unit.

2. The light source module as claimed in claim 1, wherein the dichroic unit is disposed obliquely with respect to the reflection unit.

3. The light source module as claimed in claim 2, wherein the wavelength conversion unit and the dichroic unit form a space therebetween, and the wavelength conversion unit and the dichroic unit form a closed end at one end of the space, and form an open end at another end of the space.

4. The light source module as claimed in claim 3, further comprising a light transparent body disposed in the space, wherein the wavelength conversion unit and the dichroic unit are disposed on the light transparent body.

5. The light source module as claimed in claim 3, wherein the dichroic unit comprises N bending parts, and each of the bending parts has a planar shape, an angle greater than 0 degree and smaller than 180 degrees is formed between any two adjacent bending parts, the first light emitting device comprises N light emitting devices, and N exciting beams emitted from the N light emitting devices respectively pass through the N bending parts and are transmitted to the wavelength conversion unit, wherein N is greater than or equal to 2.

6. The light source module as claimed in claim 3, wherein the dichroic unit has a curved shape.

7. The light source module as claimed in claim 3, wherein the reflection unit has a curved shape or a planar shape.

8. The light source module as claimed in claim 1, further comprising a convergent lens disposed on the transmission path of the first color beam and located between the wavelength conversion unit and the light combination unit.

9. The light source module as claimed in claim 1, further comprising a third light emitting device for emitting a third color beam, wherein the light combination unit is further disposed on a transmission path of the third color beam, so as to combine the first color beam, the second color beam and the third color beam.

10. The light source module as claimed in claim 9, wherein the light combination unit comprises a first dichroic device and a second dichroic device, the first dichroic device is for transmitting one of the first color beam and the second color beam, and is for reflecting the other one of the first color beam and the second color beam, and the second dichroic device is for transmitting one of the first color beam and the third color beam, and is for reflecting the other one of the first color beam and the third color beam.

11. The light source module as claimed in claim 9, wherein the light combination unit comprises a first dichroic device and a second dichroic device, wherein first dichroic device is for transmitting one of the first color beam and the second color beam, and is for reflecting the other one of the first color beam and the second color beam, and the second dichroic device is for transmitting one of the second color beam and the third color beam, and is for reflecting the other one of the second color beam and the third color beam.

12. The light source module as claimed in claim 1, wherein the first color beam is a green beam.

13. The light source module as claimed in claim 1, wherein a material of the wavelength conversion unit comprises a green phosphor material.

* * * * *